April 4, 1939.  U. H. TAYLOR  2,152,981
AIRPLANE WING WITH VARIABLE ANGLES OF INCIDENCE
Filed Feb. 24, 1938  2 Sheets-Sheet 1
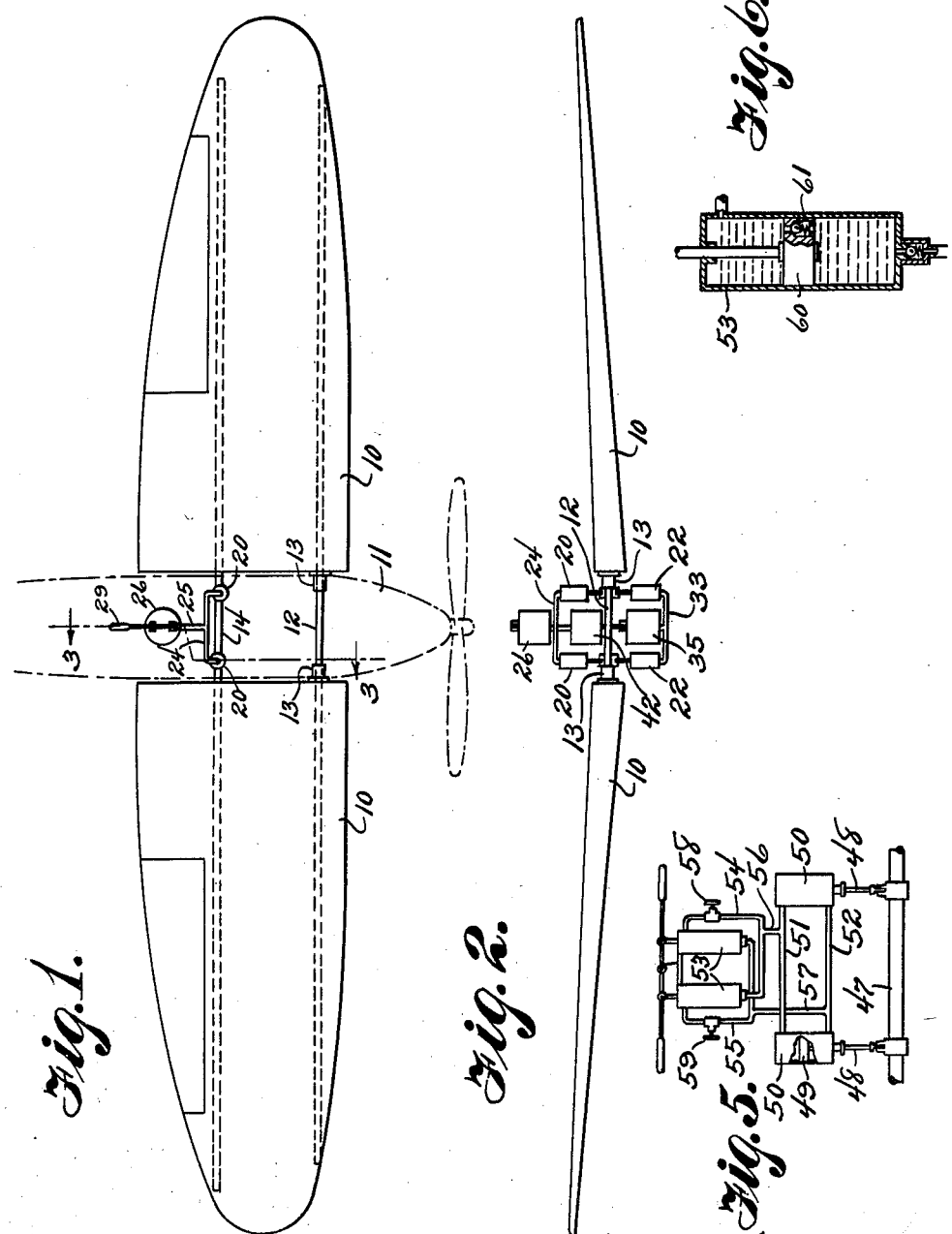
Uther H. Taylor INVENTOR
BY Victor J. Evans & Co.
ATTORNEYS April 4, 1939. U. H. TAYLOR 2,152,981
AIRPLANE WING WITH VARIABLE ANGLES OF INCIDENCE
Filed Feb. 24, 1938 2 Sheets-Sheet 2
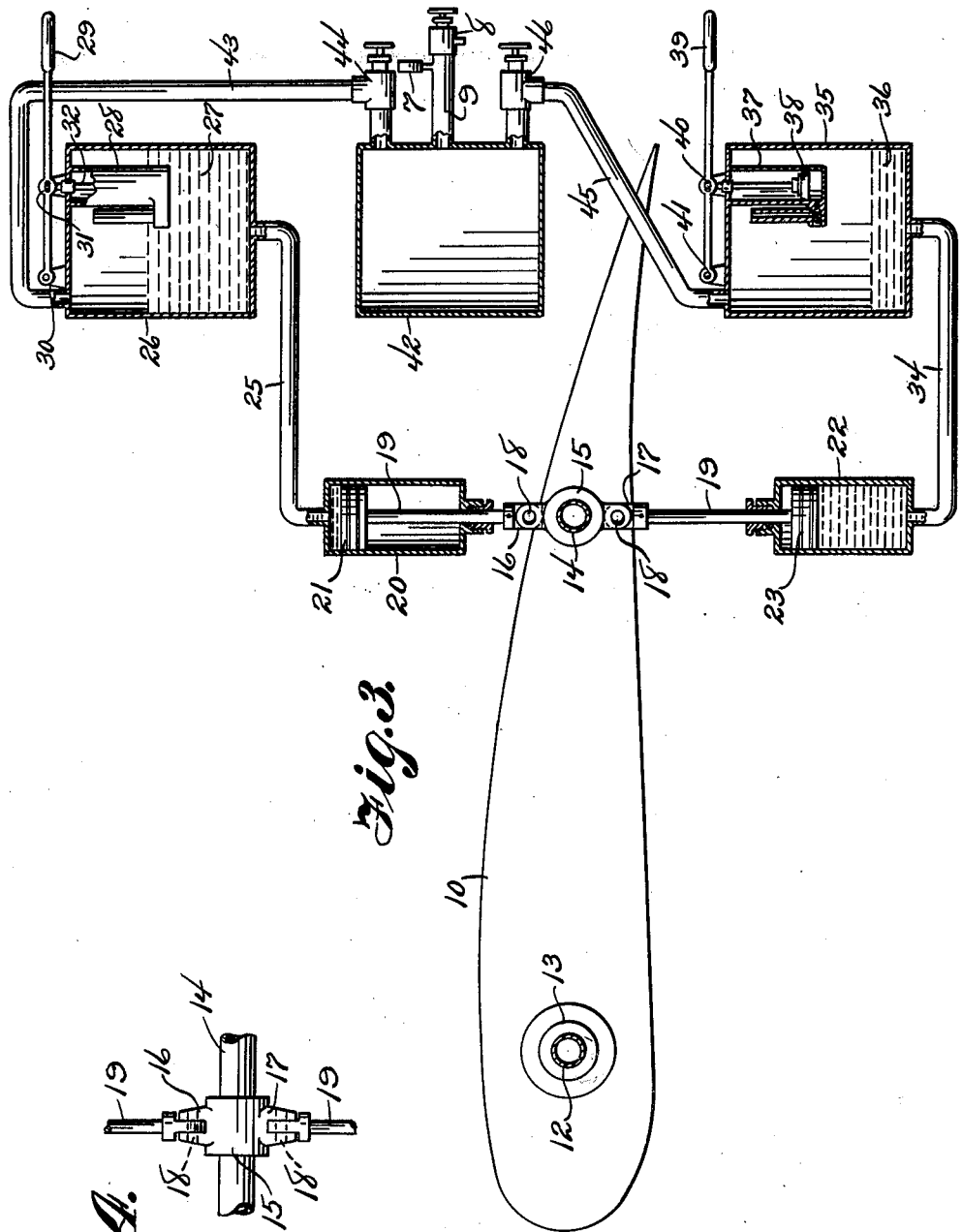
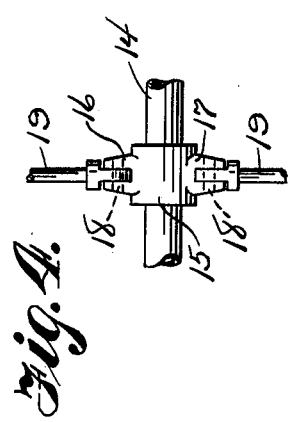
Uther H. Taylor
INVENTOR
BY Victor J. Evans & Co.
ATTORNEYS Patented Apr. 4, 1939

2,152,981

UNITED STATES PATENT OFFICE 2,152,981

AIRPLANE WING WITH VARIABLE ANGLES OF INCIDENCE

Uther H. Taylor, Mangum, Okla.

Application February 24, 1938, Serial No. 192,422

3 Claims. (Cl. 244—48)

This invention relates to an airplane wing with variable angle of incidence and has for an object to provide airplane wings pivotally mounted near their leading edges, and means connected to the wings rearwardly of their longitudinal center for varying their angle of incidence to control the lift and speed of the airplane while in flight and to provide effective air brakes for promoting a short run in landing.

A further object is to provide novel hydraulic means for varying the angle of incidence of the wings without causing flutter while the change is being made.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of an airplane with the fuselage shown in broken lines and showing the wings and means for changing their angle of incidence, constructed in accordance with the invention.

Figure 2 is front elevation of the wing structure and hydraulic angle of incidence changing mechanism shown in Figure 1.

Figure 3 is an enlarged longitudinal sectional view taken on the line 3—3 of Figure 1.

Figure 4 is a detail front elevation showing the pivotal connection between the pistons of the control cylinders and the rear spar of the wings for raising and lowering the rear ends of the wings.

Figure 5 is a front elevation of a modified form of angle of incidence control mechanism.

Figure 6 is an enlarged longitudinal sectional view of one of the pump cylinders shown in Figure 5.

Referring now to the drawings in which like characters of reference designate similar parts in the various views, 10 designates airplane wings pivotally mounted upon opposite sides of the fuselage 11 by means of a tubular metal front spar 12 which is common to both wings and is disposed near the leading edges of the wings. The spar is rotatably mounted in sleeve bearings 13 fixed to the fuselage. A rear spar 14, common to both wings and disposed in rear of the longitudinal median lines of the wings is provided at spaced points in the fuselage with spaced sleeves 15 which are fixed to the spar and are each provided with hinge ears 16 above the spar and with hinge ears 17 below the spar through which the pivot pins 18 of the piston rods 19 are passed, as best shown in Figure 4.

Movement of the piston rods upwardly decreases the angle of incidence of the wings by swivelling the wings on the bearings 13 in an upward direction and downward movement of the piston rods increases the angle of incidence by swivelling the wings on the bearings 13 in a downward direction.

The adjustment of the angle of incidence is accomplished by a pair of hydraulic cylinders 20 mounted above the wings and receiving the pistons 21 of the upper piston rods 19 and a pair of hydraulic cylinders 22 mounted below the wings and receiving the pistons 23 of the lower piston rods 19. The cylinders are so connected that one pair pushes against the opposite or opposing pair. When more pressure is applied to one pair, and the pressure of the other pair is decreased, then the rear spar of the wings moves upwardly or downwardly according to the preponderance of pressure. The cylinders are fixed to the structure of the fuselage within convenient reach of the pilot.

The upper cylinders are connected together at the top by a pipe 24, best shown in Figure 2, and this pipe is connected by a pipe 25 to the bottom of the cylinder 26 which contains an oil supply 27 and in which is mounted an air pump 28 for compressing air in the cylinder above the oil supply to force the oil under pressure into the cylinders 20 above the upper pistons 21. The pump is provided with an operating lever 29 which is fulcrumed at one end on a lug 30 disposed on the top of the pressure cylinder 26 and pivotally connected intermediate its ends by a pivot pin 31 to the pump piston 32.

The apparatus just described is duplicated for supplying oil under pressure to the lower cylinders 22 against the bottom of the pistons 23 thereof and comprises a pipe 33 connecting the lower cylinders together, as shown in Figure 2, a pipe 34 connecting this pipe with the bottom of a cylinder 35 containing an oil supply 36 and provided with an air pump 37 the piston 38 of which is operated by a lever 39 pivotally connected intermediate its ends to the piston by a pivot pin 40 and fulcrumed at one end on a lug 41 rising from the top of the cylinder.

An important feature of the invention is the tank 42 into which compressed air from the upper pressure cylinder 36 or the lower pressure cylinder 35 is selectively released to prevent flutter of the wings when change in incidence is being made as will presently be described. A pipe 43 leads from the top of the upper pressure cylinder 36 and opens into the side of the release tank 42. A valve 44 controls the pipe. Likewise a pipe 45 leads from the top of the lower pressure cylinder 35 and opens into the side of the release tank near the bottom thereof, this pipe also being controlled by a valve 46.

When a high angle of incidence is desired the pressure in the lower cylinders 20 is gradually decreased by opening the valve 26 to release pressure into the pressure release tank 42 whereupon the preponderance of pressure on top of the pistons 21 in the upper cylinders 20 forces the rear spar downwardly to lower the rear ends of the wings. When a low angle of incidence is desired pressure on top of the upper pistons 21 is released into the pressure release tank 22 by opening the valve 44 whereupon the preponderance of pressure against the bottom of the pistons 23 in the lower cylinder 22 forces the rear spar 14 upwardly to lift the trailing edges of the wings. The pressure in the tank 42 prevents any sudden fluctuation of pressure in the lower cylinders or in the upper cylinders so that a change of incidence is made gradually and steadily and fluttering of the wings is eliminated.

When an airplane is climbing in taking off, or when it is carrying a heavy load the angle of incidence can be set for the best results. When the plane has attained the desired altitude the angle of incidence may be reduced to a minimum thereby reducing drag or wind resistance and promoting increased speed. When the plane starts to land the angle of incidence may be increased, thus increasing the lift of the wings to allow the plane to travel at a lower speed. The increased drag slows the plane down and the increased lift supports it at a lower speed. If the angle of incidence is then gradually increased the drag slows the plane in proportion and the lift is correspondingly increased so that the plane will settle slowly until the wheels touch or are about to touch the ground whereupon the angle of incidence may be increased to the fullest extent to cause the wings to function as air brakes to promote a short run.

To control pressure in the control tank 42, a pressure release pipe 9 is connected with the tank and is controlled by a valve 8 to release excessive pressure to the atmosphere. A pressure gauge 7 is connected to the pipe and indicates pressure in the tank 42.

A modified form of the apparatus for changing the angle of incidence is shown in Figure 5 in which the lower cylinders are dispensed with. In this modified form of the invention no air is used but fluid is pumped into a pair of cylinders against the bottom of the pistons or against the top of the pistons to cause the pistons to raise or lower the rear spar and thus change the angle of incidence of the wings.

In the modified form of the invention the rear spar 47 is pivotally connected to the piston rods 48 of pistons 49 of a pair of hydraulic cylinders 50. The cylinders are connected together at the top by a pipe 51 through which oil may be let into the cylinders on top of the pistons. The cylinders are connected together at the bottom by a pipe 52 through which oil may be let into the cylinders against the bottom of the pistons.

A pair of pump cylinders 53 are provided. Pipes 54 and 55 connect each cylinder of the pair above the piston, with the other cylinder of the pair, below the piston. Pipes 56 and 57 connect the pipes 53 and 54 respectively with the pipes 51 and 52, of the hydraulic cylinders. When one of the valves 58 or 59 in the pump cylinder pipes is open, and the other valve closed, oil may be simultaneously pumped into the hydraulic cylinders on one side of the piston and returned into the pump cylinders from the other side of the pistons to move the rear spar and change the angle of incidence of the wings. The pistons 60 of the pump cylinders are provided with check valves 61 to permit this operation.

From the above description it is thought that the construction and operation of the invention will be fully understood without further explanation.

What is claimed is:

1. In an airplane, a fuselage, wings on each side of the fuselage pivotally connected to the fuselage near their leading edges, superposed hydraulic cylinders having opposed pistons connected to the wings rearwardly of their longitudinal center, and an air reservoir connected to the cylinders for creating a differential of pressure in the cylinders to vary the angle of incidence of the wings.

2. In an airplane, a fuselage, wings on each side of the fuselage pivotally connected to the fuselage near their leading edges, a rear spar common to both wings projecting through the fuselage, superposed hydraulic cylinders, one underneath the wings and the other above the wings, having opposed pistons connected to the portion of the spar which is disposed within the fuselage, and an air reservoir connected to the cylinders for creating a differential of pressure in the cylinders to vary the angle of incidence of the wings.

3. In an airplane, a fuselage, wings on each side of the fuselage, a front spar common to both wings, bearings on the fuselage in which said front spar is swivelly mounted, a rear spar common to both wings and projecting through the fuselage, hydraulic cylinders disposed respectively below and above that portion of the rear spar which is disposed within the fuselage and having opposed pistons connected to said portion of the rear spar, and an air reservoir connected to the cylinders for creating a differential of pressure in the cylinders to vary the angle of incidence of the wings.

UTHER H. TAYLOR.